United States Patent [19]

Klein

[11] 4,155,973
[45] May 22, 1979

[54] PROCESS FOR THE MANUFACTURE OF A TAPERED LEADER

[76] Inventor: Gerald B. Klein, 13451 Stuart Ct., Broomfield, Colo. 80020

[21] Appl. No.: 853,217

[22] Filed: Nov. 21, 1977

Related U.S. Application Data

[62] Division of Ser. No. 706,469, Jul. 19, 1976, abandoned.

[51] Int. Cl.² ............................................. B29C 17/02
[52] U.S. Cl. ......................................... 264/291; 43/44; 43/98; 428/399; 428/910
[58] Field of Search .............. 264/291, 290 N, 290 R, 264/290 T, 210 F, DIG. 73

[56] References Cited

U.S. PATENT DOCUMENTS

| | | | |
|---|---|---|---|
| 2,249,510 | 7/1941 | Welker | 264/291 |
| 2,515,175 | 7/1950 | Arbogast | 264/291 |
| 3,380,122 | 4/1968 | Kirk | 264/291 |
| 3,505,444 | 4/1970 | Stanley | 264/290 R |
| 3,508,553 | 4/1970 | Kambar et al. | 264/291 |
| 3,577,987 | 5/1971 | Bronnenkant | 264/291 |
| 3,781,402 | 12/1973 | Hanggi et al. | 264/291 |

Primary Examiner—James B. Lowe
Attorney, Agent, or Firm—Dennis O. Kraft

[57] ABSTRACT

The invention provides a tapered filament of nylon, or a like drawable synthetic resin plastic. A leader for fishing tackle is a preferred use for such a filament.

A tapered filament blank of undrawn material is formed and drawn to produce the finished product. The drawing operation is effected, essentially, by holding the larger end of the filament blank with a fixed grip and the smaller end of the filament blank with a shiftable grip. The shiftable grip is shifted along the reach of the filament to remain near the shoulder of the draw as the draw proceeds. A preferable operation will provide for drawing from the small end of the filament towards the larger end and winding the drawn portion upon a drum, or pulling it by gripping rolls, and moving the larger end of the filament towards the drum, or rolls, at a rate which holds the draw shoulder near the drum or rolls.

Undrawn blank filaments may be manufactured by injection molding or extrusion operations.

5 Claims, 15 Drawing Figures

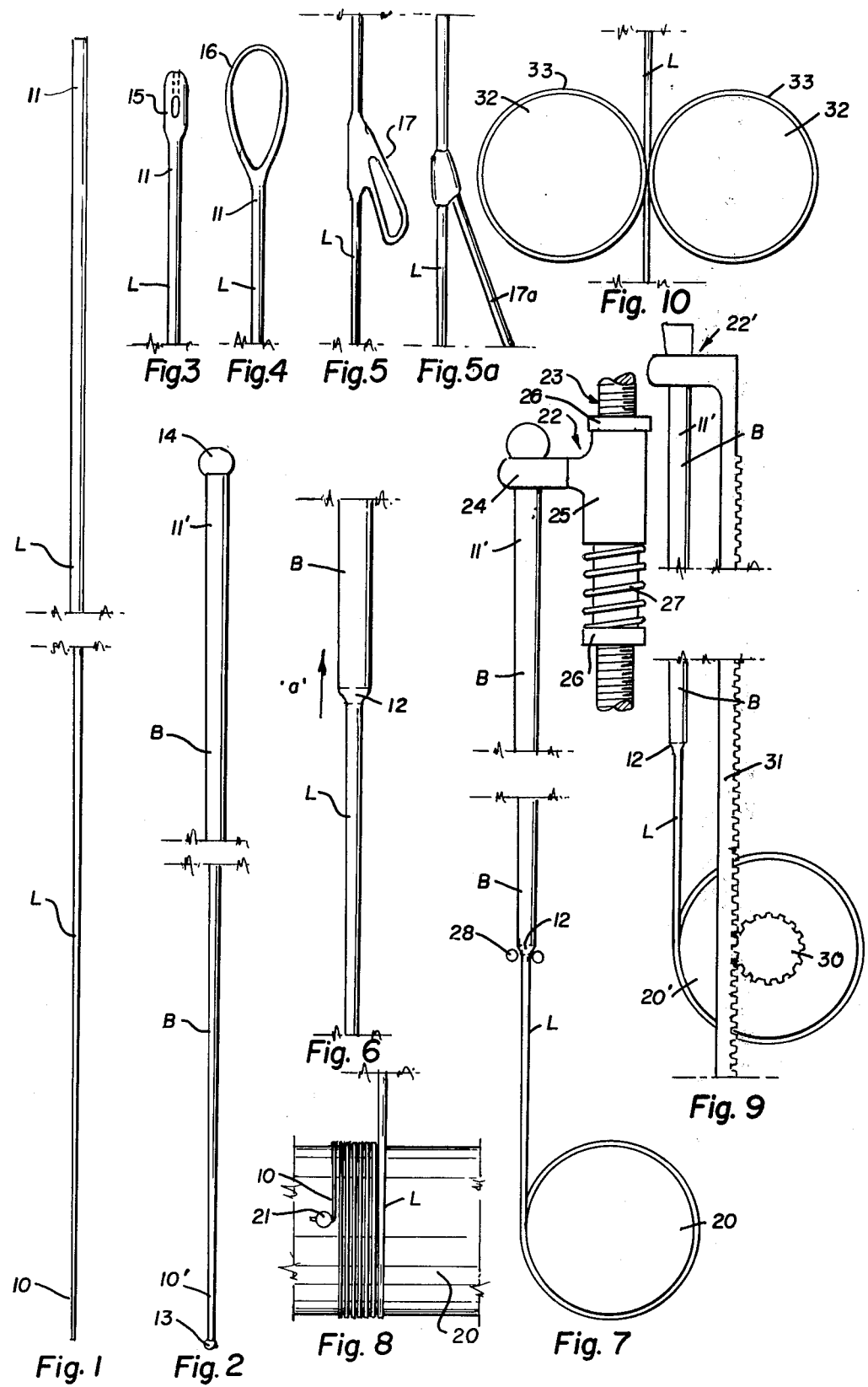

PROCESS FOR THE MANUFACTURE OF A TAPERED LEADER

This is a division of application Ser. No. 706,469 filed July 19, 1976, now abandoned.

The present invention relates to filaments of plastic material, such as nylon, and more particularly to tapered filaments. The invention is to provide a novel and improved tapered filament of nylon, such as may be used for leaders for fishing tackle and the like. Accordingly, the invention will be sometimes hereinafter called a tapered leader, or simply a leader.

Tapered leaders presently on the market are widely used for fishing in clear water and especially for fly fishing, where effective casting and visibility are important factors. Such tapered leaders are ordinarily manufactured from strands of drawn nylon by chemical or mechanical processes. The chemical process involves submerging a strand of nylon in a solution, such as carbolic acid, which dissolves nylon at a moderate, uniform rate. The nylon strand is withdrawn from this solution at a selected rate. Thus, the end portion of the strand remaining in the solution for the longest time period is eroded to a minimum diameter. This solution or etching method produces a good tapered filament or leader. The mechanical method for the manufacture of tapered filaments is to hold a nylon strand of uniform diameter against a centerless grinding machine. The grinding progressively increases as the grinding surface moves toward one end of the filament. The final result is a neat appearing, tapered filament or leader.

Neither of these methods for the production of tapered leaders are completely satisfactory since both erode or cut away a part of the filament. The etching and grinding operations will sometimes reduce the effective strength of a tapered strand such that it becomes weakened, especially near the small end of the leader. As a result of such and other production problems, good tapered leaders are quite expensive and there is a need for a more economical construction of a better tapered leader.

The present invention was conceived and developed with such a need in view and the invention comprises, in essence, a tapered filament, or leader, which is manufactured first as an undrawn tapered filament which will be called the "blank". This blank is subsequently drawn to the finished product. The drawing step is critical since the draw will preferably commence at the small-diameter end of the blank with the characteristic necking occurring during the draw operation moving along the blank toward the large-diameter end of the filament. Because of the taper, ordinary drawing procedures cannot be used. The strength of the small end of the filament is insufficient to withstand the increasing pull of the draw operation which is necessary as the filament diameter increases. Accordingly, the draw is performed with both ends of the filament moving in a controlled manner regardless of the pull force and by holding the smaller diameter portion of the filament adjacent to the draw point throughout the draw, as hereinafter described in detail.

It is contemplated that the tapered leader will be manufactured of nylon or a drawable resin having characteristics which are essentially those of nylon. To practice the invention, the blanks, tapered filaments of undrawn nylon, can be formed by injection molding or by a controlled extrusion operation. In either instance, the injection molding or extrusion, the molecular arrangement of the nylon forming the blank is in a random manner and the strength of the filament is limited. However, by drawing a blank to reduce the diameter and increase its length, the molecular arrangement is oriented, and the resulting leader is increased in strength. In industry, most nylon filaments manufactured for various purposes are drawn to improve their properties, especially to increase their strength and toughness. For example, when drawn, the strength of a nylon filament will be increased, the diameter reduced and the length increased. This increase in length will be from 100% to 400% of the original length, depending upon the type of nylon used. Such information for various types of nylon is available.

It follows that an object of the invention is to provide a novel and improved tapered filaments of a drawable resin which is drawn from a blank having the desired tapered form.

Another object of the invention is to provide a novel and improved tapered leader having a predetermined, selected taper form, such as a uniform or selectively varying taper along the reach of the leader, without the surface thereof being scored by etching pits or grinding scratches.

Another object of the invention is to provide a novel and improved method for manufacturing a drawn tapered leader from a tapered filament blank formed by injection molding.

Another object of the invention is to provide a novel and improved tapered leader which may be manufactured from a blank formed by injection molding and which includes connector ends integral with the filament.

Other objects of the invention are to provide a novel and improved tapered leader and a method for drawing the same which results in a neat appearing, flawless product produced by simple, low cost operations.

With the foregoing and other objects in view, my present invention comprises certain constructions, combinations and arrangement of materials, and sequences, operations and steps, all as hereinafter described in detail, defined in the appended claims, and illustrated in the accompanying drawing, in which:

FIG. 1 is a view of a tapered filament or leader of the type which may be formed according to the present invention, with the taper being somewhat exaggerated and with portions thereof broken away to conserve space.

FIG. 2 is a view similar to FIG. 1 showing a tapered leader blank which is subsequently drawn into a finished product, such as shown at FIG. 1.

FIG. 3 is a fragmentary view, showing one end of a tapered leader with a line connector formed thereon.

FIG. 4 is a fragmentary view, similar to FIG. 3, but with a loop formed at the end of the leader.

FIG. 5 is a fragmentary view showing an intermediate portion of a tapered leader with a loop therein.

FIG. 5a is a fragmentary view showing an intermediate portion of a tapered leader with a dropper line extending therefrom.

FIG. 6 is a diagrammatic view showing a fragment of a tapered leader blank being drawn to produce a finished unit.

FIG. 7 is a diagrammatic view of an apparatus for drawing a tapered leader blank in accordance with the principles of the invention, wherein the smaller end of the leader is wound upon a drum to prevent its being broken when the larger-diameter portions of the leader are being drawn.

FIG. 8 is a fragmentary side view of the drum shown at FIG. 7.

FIG. 9 is a diagrammatic view, similar to FIG. 7, showing another apparatus for drawing a tapered leader blank.

FIG. 10 is a diagrammatic view of a pulling component, a pair of opposing pressure rolls which may be used in lieu of the drums shown at FIGS. 7, 8 and 9.

Figure 11:
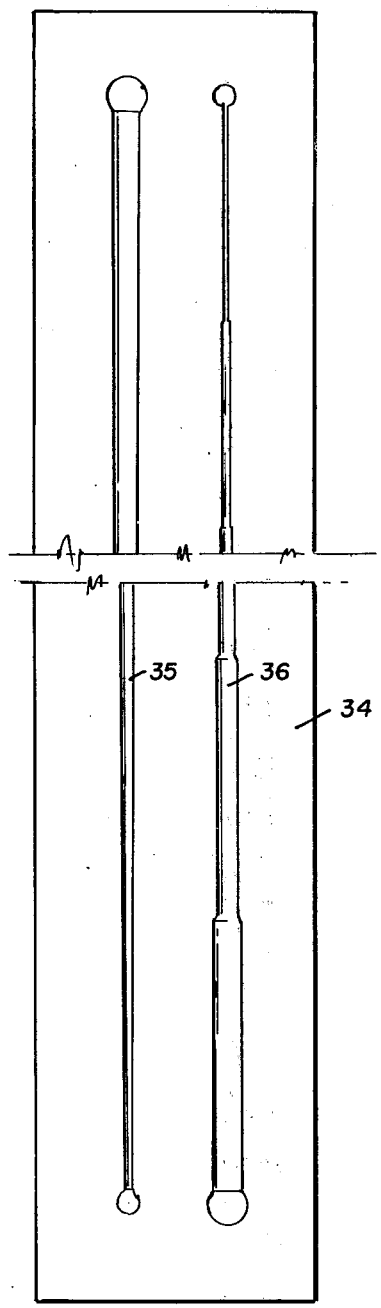
FIG. 11 is a face view of one side of a mold wherein tapered blank cavities are formed, the mold showing two different types of cavities, one having a continuous taper and the other having a stepped taper.

Referring more particularly to the drawing, FIG. 1 shows a tapered leader L in a final, commercial form, and it is representative of several conventional tapered leaders available on the market, as well as the improved tapered leader manufactured according to the present invention, as hereinafter described. This tapered leader L may be of any suitable length, and the small tippet end 10 may be as small as 0.003 inch in diameter, while the line end 11 may be as large as 0.030 inch in diameter. The strength of the leader at the small tippet end 10 may be only one or two pounds, and the strength of this leader will increase as the diameter increases. Thus, it may be as much as, or more than, 40 pounds at the line end 11. This leader L is shown with square-cut ends, but it is to be recognized that loops may be tied in these ends before they are sold to the public or afterward.

Leaders of the type herein considered are almost universally made of drawn nylon, the strongest material available which also has other desirable physical properties. All tapered leaders presently available are made of drawn nylon by etching or grinding methods heretofore mentioned. In the present invention, there is provided an undrawn nylon blank B, FIG. 2, formed as hereinafter described. It is to be noted that, while the preferred material for this blank is nylon, the invention can also be used to produce tapered strands of other drawable, synthetic plastic resins, which can be formed as undrawn blanks and subsequently drawn. For example, certain polyolefins and cellulosic resins will have such properties, although, insofar as leaders are concerned, they are usually deficient in strength.

The blank B is similar to the tapered leader L, having a small tippet end 10' and a larger line end 11', although it will be much shorter and larger in diameter than the finished product. This blank is drawn, as will be described. The percent of elongation during the draw will be known, depending upon the type of nylon used, and this will establish the proper size of the blank B to produce a finished leader L having the desired length and diameter. As mentioned, this elongation may be from 100% to 400%, depending upon the type of nylon used. The nature of a draw is indicated at FIG. 6 where the blank B is converted into a leader L by pulling the same to reduce the diameter of the blank and increase its length. The draw action ordinarily occurs at a transition point, a shoulder 12, where the diameter of the filament decreases with the corresponding increase in length, and this shoulder will travel along the reach of the blank B, as in the direction of the indicated arrow a. It is to be noted that the force to draw this blank B is proportional to the square of the diameter of the filament at any point, and thus the drawing action will normally proceed from the tippet end 10' and toward the larger line end 11' as the drawing force increases.

Whenever a tapered blank B is formed by injection molding, as hereinafter described, the blank B will have enlarged ends, such as knobs 13 and 14 shown at FIG. 2. This is necessary to provide for channels in the mold to better direct the fluid nylon into the mold cavity forming the blank. Whenever the tapered leader L is finished, these knobs 13 and 14 may be cut away. However, the ends may also be otherwise formed. FIG. 3 shows an end having an enlargement in the form of a connector 15.

FIG. 4 shows an end in the form of a molded end loop 16.

Injection molding a tapered leader blank has the further advantage in that intermediate members may be formed in the blank B which will not interfere with drawing the blank. Such a member may be a loop 17, as at FIG. 5, or one or more dropper strands 17a, as at FIG. 5a.

The tapered leader blank B cannot be drawn by a conventional operation, such as that which provides for continuously pulling and drawing a nylon strand of indefinite length with a constant draw force. The length of a blank B is limited and the draw force will vary with the diameter of the blank, commencing with a minimum force at the small tippet end 10' and increasing to a maximum force at the larger line end 11'. The force needed to draw the line end 11' may be ten times the force needed to draw the small tippet end 10'. It was found that the draw is preferably commenced at the small end of the blank to proceed toward the large end, though it could proceed in the opposite direction. The percent elongation during the draw will be essentially constant regardless of the changing diameter of the blank and the increasing force necessary to continue the draw. The drawn portion forming the leader L must be held near the draw shoulder 12 at all times as the draw proceeds, to prevent breaking. This means that the point at which the smaller side of the blank is gripped must constantly move with the movement of the draw shoulder 12.

FIGS. 7 and 8 illustrate in a diagrammatic manner an apparatus to draw a tapered leader blank B according to the conditions set forth above. The figures show the drawing of a single blank B, but it is to be understood that a number of blanks may be drawn simultaneously. A rotating mandrel or drum 20 includes a connector 21 for holding the small tippet end 10' of the blank B, and this drum is rotated at a selected rate to wind up the small end of the blank B as it is drawn into a leader, as best illustrated at FIG. 8. Friction of the leader wound about the drum will hold the point of gripping at the portion of the leader being wound on the drum. The opposite end of the blank, the larger line end 11', is held upon a carrier 22 which travels upon a lead screw 23 to move toward the drum as the finished leader is wound upon the drum. Because of the stretch of the leader, the carrier movement is at a rate differing from the wind rate of the drum. This carrier 22 may include an arm 24 outstanding from a sleeve 25 slidably mounted upon the carrier. The line end 11' of the blank is held by this arm by a suitable clamp, a part of the arm. The carrier 22 is formed as an internally threaded tube somewhat longer than the sleeve 25, and the movement of the sleeve upon this tube is restricted by enlarged ends 26 on the tube. A spring 27 about the tube resiliently urges the sleeve 25 away from the drum 20, so that the sleeve may yield in a resilient manner to the pull force produced in drawing the blank B.

In operation of this unit, the drum 20 will rotate at a fixed rate, as mentioned, and, at the same time, the lead screw 23 will rotate to permit the carrier 22 to move toward the drum. The movement of the carrier toward the drum will be timed to a rate which may be one-half to one-fifth the peripheral rate of the drum, to permit the drum to properly wind up the leader L as it is drawn from the blank. The draw shoulder 12, which forms when drawing commences, will be maintained a short distance from the drum 20, and feelers 28 may be provided to detect this draw head. These feelers can be associated with a servo-mechanism which functions to slow down or speed up the rotation of the lead screw with respect to the rotation of the drum in such a manner as to keep the draw shoulder 12 closely adjacent to the feelers. The servo-mechanism for this purpose and mechanisms to drive the drum and lead screw are not shown, since the same are conventional. Thus, the friction of the leader about the drum will place the pull of the leader near the draw shoulder 12 and eliminate any excess pull which would otherwise occur at the small tippet end 10' of the leader as the larger diameter portion of the blank is being drawn. Thus, an undrawn blank will not be pulled apart or broken unless it is defective.

The apparatus is illustrated at FIG. 9 and is similar to that shown at FIG. 7 but it is simplified in that the drum 20' is directly operatively associated with the carrier 22', to provide a drawing operation where the elongation of the nylon is definitely known. A pinion 30 is affixed to the drum 20' and the carrier 22' is connected to a rack 31 engaging the pinion 20. As the drum rotates, the pinion rotates therewith to move the rack 31 and the carrier 22' toward the drum at a rate which is proportioned to the diameter of the pinion and the diameter of the drum. For example, FIG. 9 shows a pinion having a diameter of approximately one-half the diameter of the drum. This arrangement would function properly for drawing a nylon blank where the nylon was a type drawable to an elongation of 100%.

In some instances, it may be undesirable to wind the leader L formed from the drawn blank upon a drum 20. It is, nevertheless, possible to hold the leader at a point adjacent to the draw shoulder, as drawing proceeds, by using a pair of opposing rollers 32 in lieu of the drum 20, as indicated at FIG. 10. These rollers 32, of a suitable diameter, will snugly grip the leader filament and rotate to pull the leader through them as the draw proceeds. It is contemplated that each roller will have a tire 33 at its periphery of a suitable rubber-like material to enhance the gripping of the leader filament without slippage or without damaging the leader. A carrier, not shown, will hold the large end of the undrawn blank and move toward the rollers as they rotate, in the same manner as heretofore described.

FIG. 11 illustrates the face of a mold 34, such as may be used to produce a tapered blank B, by injection molding. A simple mold is shown, but it is contemplated that this mold could include features for drawing the strand as it is formed. This mold 34 is a long, rectangular member and two cavities for tapered blanks B are shown therein, a cavity 35 for a uniformly tapered blank and a cavity 36 for a stepped blank. A production mold of this type could have many such cavities, as hereinafter further described. This mold 34 will include a mating face, not shown, which closes the mold cavities in a manner conventional to molds used for injection molding. Also, this mold 34, as illustrated, will be comparatively long to accommodate the long, small diameter cavities 35 and 36 to produce blanks B. Thus, it may require special heating of this mold and a longer injection cycle time than would ordinarily be used for injection molding of nylon. However, such is a production problem well within the skill of artisans in this field.

The formation of a mold cavity 35 having a continuous taper would require a cutting operation in the mold block where a special cutting tool must continuously vary in diameter. Such may not be available and the continuous taper would then involve hand honing operations. The mold cavity 36 using a stepped taper can be formed much more easily by use of a number of carefully sized round end mill cutters and, if necessary, a certain amount of hand honing can be used to minimize the changes of diameter between the several steps.

The taper of the leader and blank shown at FIGS. 1 and 2 is illustrated as a uniform variation of diameter with respect to the length of the leader. Such is one desirable mode of manufacturing a tapered leader, but the taper may be varied in other ways, and the variation of the taper with respect to the length of the leader can be according to any selected function. For example, a desirable tapered leader may take a form which provides for a uniform variation of cross sectional area of the leader with respect to the length of the leader where the diameter will not vary uniformly. Such variations can be easily included in the mold cavity, should they be desirable.

Figure 12:
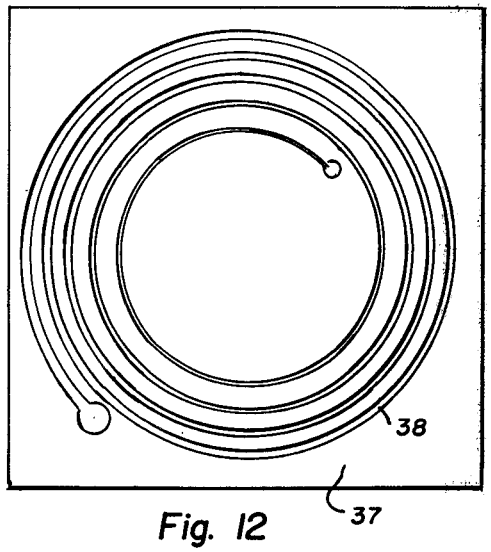
FIG. 12 is a face view of one side of another type mold wherein a tapered leader blank cavity is formed as a spiral to conserve space in the mold.

Because of the unusual length of a mold cavity to provide for a straight tapered blank, a more compact, square mold 37 can be provided, as indicated at FIG. 12, where the tapered mold cavity 38 is formed as a spiral. The spiral cavity 38 must be of a diameter sufficient as to permit a blank molded in this manner to be drawn and remain straight after the draw, for it was found that too sharp a diameter will prevent the tapered leader from lying straight. A few tests can establish the necessary proportions for obtaining this result.

Figure 13:
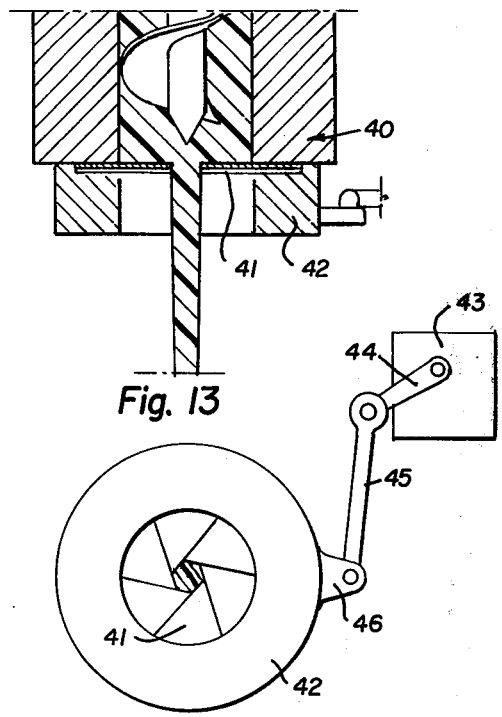
FIG. 13 is a diagrammatic sectional view of a fragment of the head of an extruding machine which extrudes tapered filaments of a type which can be used in the present invention.
Figure 14:
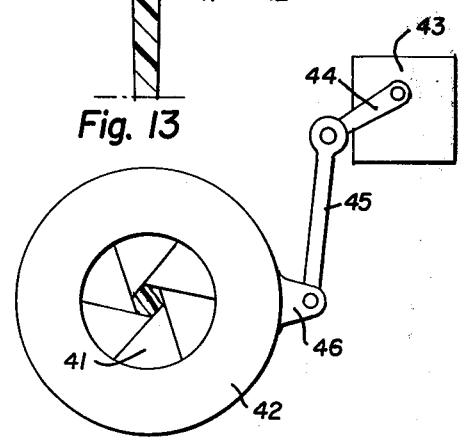
FIG. 14 is a diagrammatic end view of the extruder shown at FIG. 13, showing in a somewhat schematic manner a mechanism to vary the diameter of the extruder orifice to produce a tapered filament.

Nylon strands are commonly formed as by extruding a semi-fluid resin, and in the development of extruding apparatus, some attention has been given to extruding tapered strands for experimental purposes. Such extruding apparatus will have variable diameter die orifices that may function in a manner similar to an iris diaphragm. FIGS. 13 and 14 therefore show, diagrammatically, an arrangement of an extruding die 40 having an iris diaphragm 41 which shifts from a more open to a more closed position. To provide a tapered filament with this die, the iris diaphragm 41 must shift at a selected rate, while the extrusion operation is under way. The plates of the iris diaphragm are shiftable by rotation of a head 42 through a small arc. The details of this construction need not be explained, since the same is a comparatively conventional mechanism. To shift the head 42 through a selected arc at a fixed rate, the apparatus may include a motor 43 having a crank 44 and a connecting rod 45 from the crank to an arm 46 at one side of the head 52. Accordingly, as the die extrudes the nylon, the rotating crank shifts the head back and forth to open and close the diaphragm, providing a tapered filament varying from a larger diameter to a smaller diameter and thence from a smaller diameter to a larger diameter in a continuous manner. The filament may subsequently be cut to length to form a leader blank which is then drawn in the manner heretofore described. Also, in forming such a filament, it is possible, with specialized extruding apparatus, to produce a hollow, tapered strand which may be drawn in the same manner as hereinabove set forth.

I have now described my invention in considerable detail. However, it is obvious that others skilled in the art can build and devise alternate and equivalent constructions which are nevertheless within the spirit and scope of my invention. Hence, I desire that my protection be limited not by the constructions illustrated and described, but only by the proper scope of the appended claims.

I claim:

1. A method for the manufacture of a drawn, tapered elongated filament from a tapered filament blank of undrawn, drawable synthetic resin, including the steps of:
   holding one end of the filament blank at a first gripping point;
   gripping the other end of the filament blank at a second gripping point;
   applying a stretching force between the first and second gripping points to tension the filament and effect a drawing of the same while simultaneously and continuously moving one of the gripping points along the reach of the filament as the draw progresses to maintain said one gripping point close to the traveling shoulder of the draw.

2. The method defined in claim 1, wherein the first gripping point is a fixed point on the larger diameter end of the filament blank, and wherein the second gripping point is the movable gripping point disposed on the smaller diameter end of the filament, the method further comprising the step of continuously decreasing the relative distance between the first and second gripping points as the draw progresses to effect a drawing of the filament along its entire length.

3. The method defined in claim 2, wherein the second, movable gripping point is effected by winding the small end of the filament on a rotating drum as the filament is drawn.

4. The method defined in claim 3, wherein the rotation of the drum is accompanied by movement of the first gripping point towards the drum at a rate which is inversely proportional to the elongation of the filament produced by the draw.

5. The method defined in claim 2, wherein the second, movable gripping point is effected by passing the small end of the filament between gripping rollers as the filament is drawn.

* * * * *